Nov. 4, 1969   K. R. LARSON   3,475,953
PRE-SET ADJUSTABLE TORQUE MEASURING DEVICES
Original Filed July 9, 1964   2 Sheets-Sheet 2
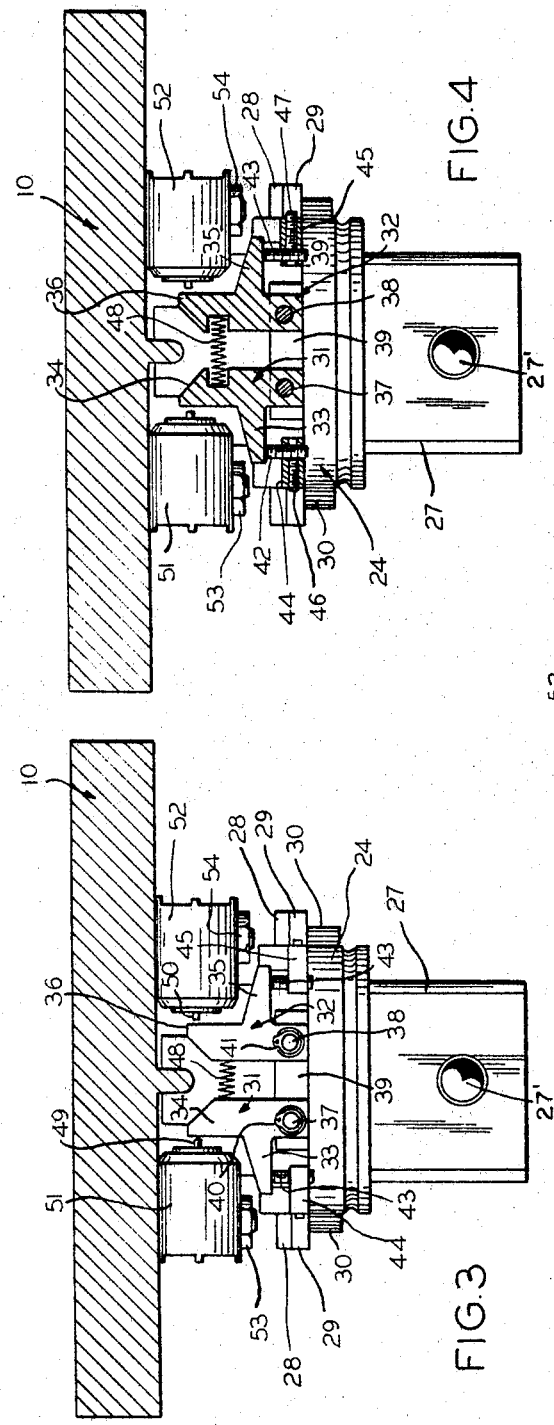
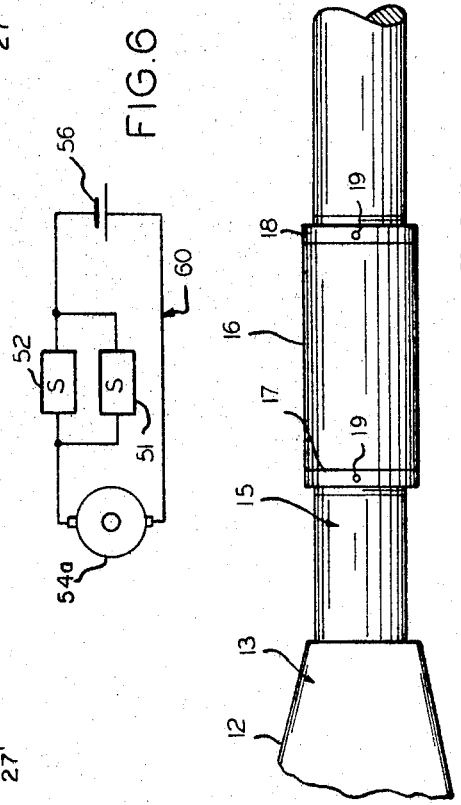
INVENTOR.
KENNETH R. LARSON
BY
ATTORNEY

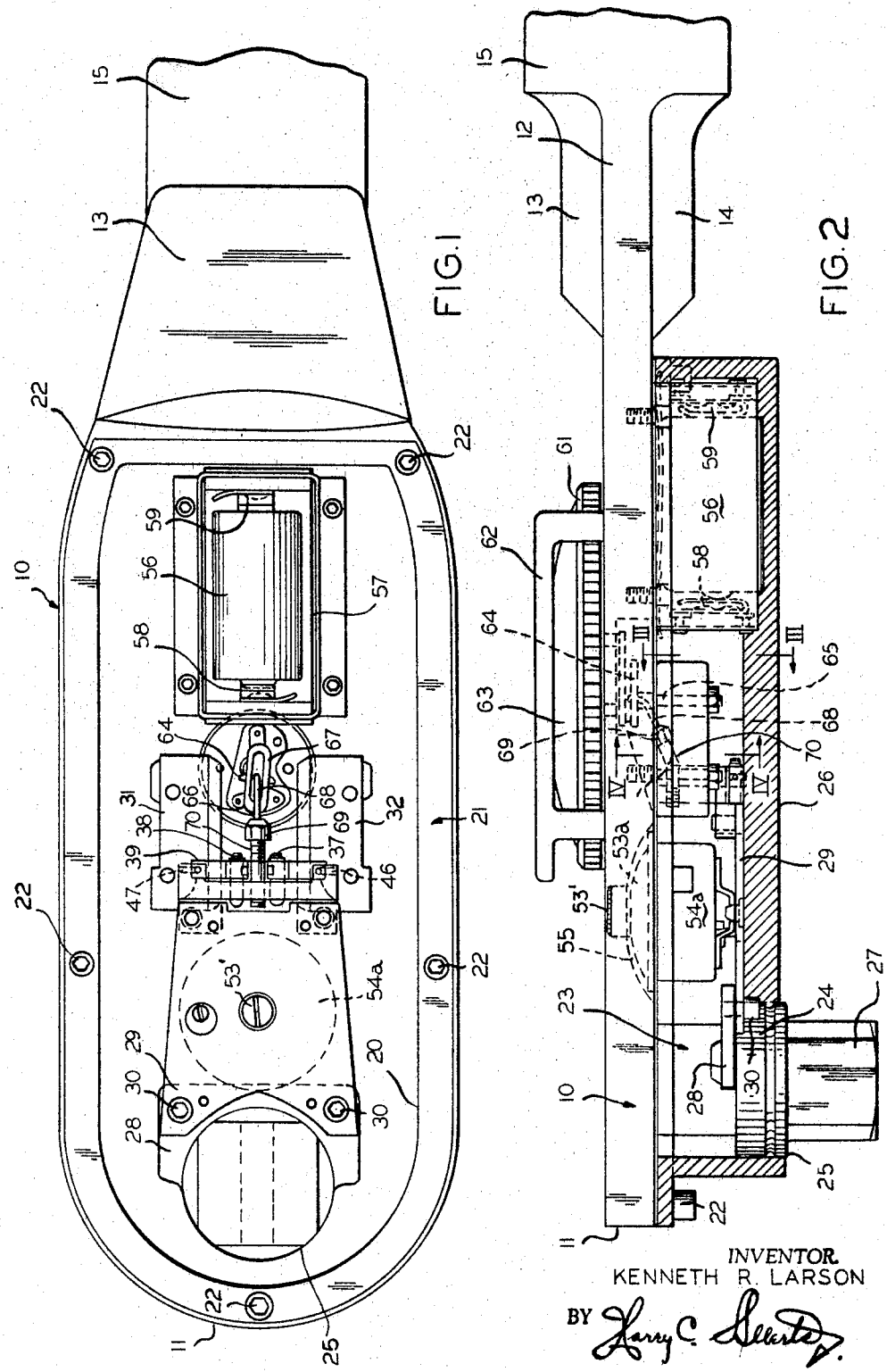

United States Patent Office 3,475,953
Patented Nov. 4, 1969

3,475,953
PRE-SET ADJUSTABLE TORQUE MEASURING DEVICES
Kenneth R. Larson, Des Plaines, Ill., assignor to Snap-On Tools Corporation, Kenosha, Wis., a corporation of Delaware
Continuation of application Ser. No. 381,408, July 9, 1964. This application Mar. 25, 1968, Ser. No. 721,544
Int. Cl. G01l 5/24; B25b 23/14
U.S. Cl. 73—139                     6 Claims

ABSTRACT OF THE DISCLOSURE

The invention involves a torque responsive device adapted to yield commensurate with a load transmitted thereto through a handle member against which an object moves to measure the alignment or degree of misalignment within acceptable limits, and accomplishing this function through combined mechanical-electrical pre-set instrumentalities operatively connected with the torque responsive elements. A handle mounted roller may be provided to minimize the friction between the moving object and the handle member during the impact and alignment measurement.

---

The present invention relates to turning devices and more particularly to torque measuring and indicating wrenches of the type shown and described in United States Letters Patents Nos. 2,312,104, 2,367,224, 2,682,796, and 2,792,734 dated Feb. 23, 1943, Jan. 16, 1945, July 6, 1954, and May 21, 1957, respectively, which are general purpose torque wrenches as distinguished from a more or less special purpose measuring device involved herein, although the teachings of the present invention may be employed for general use with equal advantage.

This application is a continuation of my application Ser. No. 381,408 filed July 9, 1964, now abandoned.

It contemplates more especially the provision of measuring instrumentalities which are self-contained and capable of determining the acceptability of certain operations such as the proper or improper alignment of moving objects or devices moving along a guided path such as the loading of firing tubes with missiles or the like which if allowed to descend in improper alignment would cause the skin or casing thereof to be fractured or cause the binding thereof and thus result in the improper loading of the firing tubes therewith.

The usual dial indicators on torque wrenches are not always accessible to the eye of the observer or user during the operation thereof so that supplemental indicators such as an audible signal producing or energizing expedients are built in to notify the attendant when the aligning mechanism for falling missiles in firing tubes should not encounter the missile by reason of its faulty alignment and correction would have to be too drastic for the proper loading with safety. When this occurs, the attendant retrieves the missile rather than take the chance that its misalignment cannot be corrected without fracturing the skin or casing thereof. The use of a special torque wrench embodying the features of the present invention determines the limit of misalignment which can safely be corrected and notifies the attendant when the missile should be retrieved rather than allowed to run down the aligning mechanism.

The structure embodying features of the present invention may be utilized with advantageous results in determining mechanically whether or not a missile in the process of being loaded into the firing tube, is descending within safe limits of alignment for safe displacement past the aligning mechanism without any possible damage to its skin or casing. If the descent of the missile is such as to be subjected to any possible damage or excessive skin tension by reason of requiring a too drastic correction by the alignment mechanism, the torque reading on the calibrated and pre-set torque measuring wrench will register beyond known safe limits and thus energize the audible signal which serves as an indicator that the missile should be diverted from its continued loading path and retrieved for reloading.

With the operation of the audible signal that can also be visually checked by reading the calibrated dial of the torque measuring wrench, the attendants are immediately informed as to whether or not the missile is proceeding in the firing tube with the proper alignment or must be halted for removal prior to the occurrence of any damage thereto. This constitutes a safety measure to avoid any unusual missile skin or casing tensions or possible fractures with consequent deleterious effects should the loading of the firing tube be allowed to continue under such adverse alignment conditions. Thus the loading of the firing tube with the missile is accomplished with utmost safety and without impairment to the missiles which can be re-used or re-loaded with better alignment to insure the proper firing and better loading procedures.

The torque wrench structure is placed in the path of the missile so that the roller equipped handle thereof will be actuated only in the event the missile is lowered in the firing tube out of alignment to some degree, and the extent of misalignment can be measured in foot pounds of torque in that there is proportional displacement of the torque handle in relation to the degree of misalignment. The limit of tolerable misalignment is known and the calibrated mechanism is set to energize an audible signal when the limit of misalignment is encountered so that the attendants are promptly informed thereof and immediately take steps to halt the further descent of the missile in the firing tube and lift the missile therefrom with instrumentalities that do not constitute a part of the present invention. Thus, the measuring instrument constitutes a protective safety feature against mishaps in the loading of the firing tubes when misalignment is significantly excessive and beyond that which should be corrected by the aligning mechanism.

One object of the present invention is to simplify the construction and improve the operation of measuring devices of the general type involved herein.

Another object is to provide measuring devices with simple and more dependable measuring instrumentalities that are pre-set to energize an audible signal when the turning impact directed thereto for any type of operation is excessive or unsafe for allowing the operation to continue.

Another object is to provide improved special purpose torque measuring instrumentalities which supplement the usual dial readings by transmitting an audible or other signal when the impact or turning movement is excessive within pre-set limits.

A further object is to provide simple and dependable auxiliary measuring means in torque wrenches which are energized when the torque values exceed certain pre-set limits.

A still further object is to provide electrical limit switches in conjunction with the usual measuring indicators that energize auxiliary signals when the torque values exceed safe pre-set limits.

Still a further object is to provide electrical limit switches in conjunction with the usual measuring instrumentalities to provide for audible or other unusual indication when the torque values exceed preset safe limits of operation thereon.

Other objects and advantages will appear from the following description of an illustrative embodiment of the present invention:

In the drawings:

FIGURE 1 is a front view of a torque measuring wrench with the cover plate removed to reveal the working parts.

FIGURE 2 is a side view in elevation of the measuring instrumentalities shown in FIGURE 1.

FIGURE 3 is a sectional view in elevation taken substantially along line III—III of FIGURE 2, to illustrate the micro-switches and levers therefor.

FIGURE 4 is a sectional view taken substantially along line IV—IV of FIGURE 2 to illustrate the signal energizing levers in section.

FIGURE 5 is a fragmentary front view of the handle extension utilized with the measuring instrumentalities.

FIGURE 6 is a diagrammatic view of the electrical circuit involved in the auxiliary indicator mechanism for energizing the audible signal.

The present invention in its preferred embodiment comprises a substantially rectangular thick steel plate 10 which is arcuately shaped at its forward end and convergingly flared at its handle end 12 which is reinforced with oppositely disposed webs 13–14 to terminate in a suitable elongated handle member 15 formed integral therewith or otherwise attached depending upon the use to which the devices are put. The handle member 15, in this instance, has a roller 16 journalled thereon between circuit collars 17–18 which are threaded or otherwise attached thereon to retain the roller 16 against longitudinal displacement while permitting the rotation thereof. Suitable recesses 19 are provided in the peripheral edges of the collars 17–18 for applying suitable spanner wrenches to tighten or loosen the collar 17–18 to any desired position for axially confining the roller 16 without impairing its freedom of rotation upon impact thereagainst by suitable objects such as missiles which descend in loading tubes equipped with firing mechanisms to propel them along a predetermined path to strike a selected target and explode. The impact against the roller 16 will be proportional to the degree of misalignment of the missile as it is lowered in the firing tube or tubes to cause a directly responsive displacement of the handle member 15 which will actuate the torque measuring instrumentalities to be hereinafter described. This will determine whether or not the missile or other projectile will safely arrive at its firing station without prior injury to its skin or casing. If the projectile's misalignment during descent exceeds safe predetermined limits, it will be shunted off by the mechanism provided for this purpose to avoid impairment to the missiles's skin by the alignment mechanism and to notify the attendants that the missile should be retrieved and halted in its descent.

As shown, the forward end portion of the thick rectangular plate 10 has a chambered housing 20 corresponding in shape thereto but somewhat smaller in size to accommodate a peripheral attaching flange 21 through which suitable machine screw fasteners 22 extend for threaded engagement with the plate 10. This provides a housing for confining the measuring and indicating instrumentalities to be presently described. A substantially cylindrical work engaging member 23 is welded or otherwise permanently anchored to the plate 10 proximate to the arcuate end 11 thereof to provide a circular shoulder 24 projecting through a somewhat larger opening 25 in the bottom 26 serving as a closure for the housing 20 after it is attached to the plate 10. The work engaging member 23 has an integral geometrically shaped projecting socket engaging drive shaft 27 which is externally accessible to afford detachable mounting or attachment for its intended purpose or function. Suitable friction detents such as the spring impelled ball 27' may be provided on the drive shaft 27 to retain detachable sockets or other turning or anchoring attachments thereto against accidental detachment in accordance with well known standard dictates of commercial practice.

An actuator plate bracket 28 is formed integral with the work engaging shoulder 24 and extends laterally therefrom to provide for the attachment of an actuator plate 29. Suitable fasteners 30 rigidly secure the actuator plate 29 to the bracket 28 to turn therewith responsive to the twist occurring in the neck or shank of the work engaging member 23 in proportion to the turning load exerted thereon in the operation of the instrumentalities for performing its torque measuring or other functions such as determining the extent of misalignment and the safe limits of misalignment of missiles or other projectiles being lowered into firing tubes for accomplishing the loading thereof. Correction of limited misalignment is possible with the alignment mechanism, but when the extent of misalignment measured by contact with the handle roller 16 during the descent of the missile occasions the loading of the torque wrench to or beyond the limit for which the audible signal 54a is set for energization as will appear more fully hereinafter, the missile is halted in its descent and retrieved after removal for re-use and other tries for loading into the firing tube.

In such situations and occurrences, the work engaging member 23 is detachable mounted to a stationary member to which it is applied and the handle 15 with its roller 16 positioned in the path of the missiles which are lowered into firing rubes comprising part of missile launching systems either on ships or elsewhere. If missiles are lowered without being properly aligned or rejected in the event the misalignment is too great for corrections, excessive skin tensions and casing fractures would result so that dangerous occurrences could take place. By reason thereof, the device comprising the teachings of the present invention is pre-set to energize an audible signal if misaligned missiles pass the handle roller 16 thereof and displace such sufficiently to indicate unsafe loading by means of an audible signal and also a calibrated visual dial. Under such circumstances, the work engaging member 23 is twisted for an extent commensurate with the degree of missile misalignment. To this end, the actuator plate 29 had two spaced compound levers 31–32 having right-angularly disposed arms 33–34 and 35–36 formed integral therewith. The compound levers 31–22 are adjustably mounted on pins 37–38 anchored to an upturned flange 39 provided on the actuator plate 29. Dished spring washers 40–41 on the pins 37–38 serve to prevent the compound levers 31–32 from having free pivotal play or looseness in their movement. Adjustable limit stops 42–43 are threaded vertically through blocks 44–45 attached to the actuator plate 29 to abut vertically and upwardly against the levers or arms 33–35. To retain the threaded stud stops 42–43 in their pre-set positions of adjustment, set screws 46–47 extend horizontally through the actuator plate blocks 44–45 to engage the threaded vertical stops 42–43 to lock them in pre-set positions. A compression spring 48 is disposed between the upstanding lever arms 34–36 to normally space and urge the levers 31–32 so that their arms 33–35 engage the stops 42–43.

As shown, the upstanding lever arms 34–36 are normally positioned in the path of the projecting detents 49–50 comprising the actuators for micro switches 51–52 that confront the lever arms 34–36. The micro switch casings 51–52 are suspended from the plate 10 by means of threaded stud fasteners 53–54 so that the rotary displacement of the plate 10 by a descending missile in the guide tube, will impact against the handle roller 16 to turn the hande 15 sufficiently when it is excessively misaligned, for causing either lever 31 or 32 to depress their confronting detent 49 or 50. This will close the battery circuit to an audible signal such as a buzzer 54a carried by the plate 10 which is recessed as at 55 to accommodate the curved top 53a thereof anchored by means of an axial fastener 53'. A battery 56 confined in a housing 57, is fitted with suitable contact terminals 58–59 (FIGURES 1 and 2) insulated from but attached to the housing 57. An electrical circuit 60 (FIGURE 6) includes the buzzer 54a, the micro switches 51–52, and the battery 56 for control by the lever arms 34 or 36 depending upon the direction of rotary displacement of the plate 10 of measuring instrument.

When this occurs, either an attendant or an automatic mechanism (not shown) will shunt the descending object or missile from its course to the firing station, and thus stop its further loading into the firing tube avoid damage to either or both the missile and the firing installation. When manually attended, the operation of the audible signal 54a will notify that further loading by controlled descent should cease and the missile retrieved by occasioning its ascent for inspection or better aligned descent. Another measuring indicator is optionally provided such as a calibrated meter 61 (FIGURE 2) preferably provided with a guard rail 62 which is fixed to the outer surface of the plate 10 to protect the meter 61 against accidental injury or damage. The meter 61 is similar to those embodied in the mechanisms illustrated and described in the letters patents listed supra. A transparent dial cover 63 (FIGURE 2) confines the mechanism for actuating a pointer mounted above a calibrated dial (not shown), and this involves a pinion and gear sector 64 whose vertical stud shaft 65 is journalled in a bracket 66 for connection to and actuation by a slotted lever 67. A thin rod 68 is provided with a lateral offset end that registers with the slotted lever 67 while the other end thereof engages a friction connector 69 complemental to a threaded stud 70 which is anchored in the upturned edge 39 of the actuator plate 29. Thus, the actuator plate 29 displaces the instrumentalities 70–69–68–67–64 to register a calibrated load reading on the meter 61 while the compound lever arms 31 or 32 are displaced toward or from the micro-switches 51–52 until such are actuated by an excessive load on the handle member 15; however, when this load is attained the audible signal 54a will be energized and any larger loads can be observed on the dial and pointer comprising the meter 61. It should be noted that intermediate load values between zero and the pre-set limit of handle displacement of the measuring instrument may also be read on the calibrated meter 61 so that the extent of misalignment of the missile's descent into the tube for loading, may also be observed to check the electrically energized signal 54a which will not function if the battery 56 is exhausted or connections in the audible signal circuit 60 are loose or become inoperative over a period of time.

The loading tube is provided with an alignment device for the missile, but the teachings of the present invention provides a measuring device and an automatic control to determine excessive misalignments of the missile prior to any damage to the skin thereof or fractures are avoided by rejecting the missile if measurements indicate that such could occur if the missile was lowered any further toward the firing mechanism in the tube beyond the alignment instrumentalities. In the event the audible signal 54a is energized or the reading from the indicator dial 61 is sufficiently high to question the advisablility of allowing any further descent of the missile, the attendant involved in the controlled lowering of the missile, can be notified in advance of the probabilities based upon the measurements upon the device described supra and is, thereupon, instructed to halt the descent of the missile and to immediately retrieve the weapon from the guide tube.

The measuring instrumentalities comprising the subject matter of the instant preferred embodiment, is in reality a detector of possible mal-function due to misalignment difficulties during the lowering of the missile and may be utilized with equal advantage as a torque measuring device for many other purposes. For other purposes, the audible signal 54a would serve to indicate when a nut turning load has reached its limit of applied force so that the operator will thereafter release his turning force or in this case the pre-set limit signal at which the object or its speed of travel or its impact upon other mechanisms are tested and rejected if irregularities appear before any damage is occasioned, may be varied if such is desirable by changing the initial pivotal position of the compound levers 31–32 by adjusting the stops 42–43. This will change the values of the torque load created by the passing or falling or impacting object in relation to the handle member 15 and its roller 16 which will translate the work engaging member 23 by twisting it in proportion to the load imposed thereon. By so doing, the audible signal 54a will be energized at the newly set limit which may be different for many operations. In fact, the device 10–23–61 may be used as a standard torque measuring wrench by utilizing the work engaging member 23 to register with fasteners through the use of adapter sockets and then applying a manual turning moment to the handle 15.

In the embodiment described supra, the reverse has been resorted to in that the work engaging member was applied to a stationary mount (not shown) and the handle subjected to an impact through the medium of its roller 16 so that the rate of speed which is a factor of the degree of impact, was measured for the purpose of accepting or rejecting objects that would not perform properly if allowed to continue on their path to the critical station such as a firing station in the case of underground missiles. The audible signal merely informs the attendant of the impending irregularity and thus can act accordingly to avoid damage and possible disaster or for that matter, automatic reject mechanisms can be actuated to accomplish the reject function after the measuring instrumentalities described supra have determined that the falling object is passing too fast or is other wise undesirable for completing its movement to a more critical station.

I claim:

1. In a pre-set measuring device, the combination with a handle member, of a torque responsive work engaging member adapted to yield commensurately with a turning load transmitted thereto through said handle member, calibrated measuring means on said handle member, actuating means extending between said torque responsive work engaging member and said calibrated measuring means, spaced electrical switch means fixedly carried by said handle member, said actuating means including spaced pairs of adjustable mechanical elements confronting said spaced electrical switch means to move in the path of one or the other thereof depending upon the directional displacement of said handle member to establish contact therewith when a commensurate pre-set load has been applied to said handle member according to the switch contact adjustment for energizing a circuit including said spaced electrical switch means.

2. In a pre-set measuring device, the combination defined in claim 1 wherein said adjustable mechanical elements include independent adjustable mechanical arms that confront said switch means.

3. In a pre-set measuring device, the combination defined in claim 2 wherein said measuring means include a calibrated meter exteriorly mounted on said handle member, and means interposed between said calibrated meter and said actuating means to transmit the applied load reading to said calibrated meter to check the pre-set operation of said spaced electrical switch contact means.

4. In a pre-set measuring device, the combination defined in claim 3 wherein said mechanical arms include lever means having compound arms, and means to adjust said arms.

5. In a pre-set measuring device, the combination defined in claim 4 wherein said means to adjust said arms include screws cooperating with said lever means to vary the spacing thereof relative to said switch means, thereby changing the pre-set load at which said circuit is energized.

6. In a pre-set measuring device, the combination defined in claim 5 including a load receiving roller journalled on said handle member, whereby the calibrated measuring means is operated responsive to the extent of translation of said handle member effected by a moving object passing over said load receiving roller.

References Cited

UNITED STATES PATENTS

| | | |
|---|---|---|
| 2,250,941 | 7/1941 | Zimmerman. |
| 2,367,224 | 1/1945 | Larson et al. |
| 2,792,734 | 5/1957 | Larson et al. |

CHARLES A. RUEHL, Primary Examiner

U.S. Cl. X.R.

81—52.5